United States Patent
Yang

(10) Patent No.: US 11,044,609 B2
(45) Date of Patent: Jun. 22, 2021

(54) METHOD AND DEVICE FOR INTEGRITY PROTECTION

(71) Applicant: VIVO MOBILE COMMUNICATION CO., LTD., Chang'an Dongguan (CN)

(72) Inventor: Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/637,227

(22) PCT Filed: Aug. 1, 2018

(86) PCT No.: PCT/CN2018/098008
§ 371 (c)(1),
(2) Date: Feb. 6, 2020

(87) PCT Pub. No.: WO2019/029415
PCT Pub. Date: Feb. 14, 2019

(65) Prior Publication Data
US 2020/0169888 A1    May 28, 2020

(30) Foreign Application Priority Data

Aug. 8, 2017 (CN) .......................... 201710671789.7

(51) Int. Cl.
*H04W 12/106* (2021.01)
*H04L 29/06* (2006.01)
*H04W 72/04* (2009.01)

(52) U.S. Cl.
CPC ......... *H04W 12/106* (2021.01); *H04L 63/123* (2013.01); *H04W 72/042* (2013.01)

(58) Field of Classification Search
CPC . H04W 80/02; H04W 76/27; H04W 72/0493; H04W 56/001; H04W 28/04;
(Continued)

(56) References Cited

U.S. PATENT DOCUMENTS

2011/0188408 A1   8/2011  Yi et al.
2011/0263222 A1*  10/2011  Farnsworth ....... H04W 12/1006
                                                              455/410
(Continued)

FOREIGN PATENT DOCUMENTS

CN    101388829 A    3/2009
CN    102487507 A    6/2012
(Continued)

OTHER PUBLICATIONS

3GPP TS 25.331 V14.3.0 Technical Specification Group Radio Access Network; Radio Resource Control (RRC); Protocol specification, dated Jun. 2017, p. 153-166 (Year: 2017).*
(Continued)

*Primary Examiner* — Daniel Lai
(74) *Attorney, Agent, or Firm* — Culhane Meadows PLLC; Stephen J. Weed

(57) ABSTRACT

A method and a device for integrity protection are provided in the present disclosure, wherein the method for integrity protection applied to a base station includes: the base station sending configuration information for integrity protection to a terminal by a radio resource control (RRC) layer message, wherein the configuration information for integrity protection is used for configuring an integrity protection function for at least one transmission resource used by the terminal in the transmission of service data.

16 Claims, 10 Drawing Sheets

(58) Field of Classification Search
CPC .......... H04W 12/0017; H04W 12/009; H04W 12/02; H04W 12/1006; H04W 24/04; H04W 28/06; H04W 28/065; H04W 12/0013; H04W 12/0609; H04W 12/08; H04W 12/10; H04W 12/1202; H04W 28/0268; H04W 72/042; H04W 48/12; H04W 12/001; H04W 12/106; H04W 12/03; H04L 1/0025; H04L 63/123; H04L 63/205; G06F 21/6245

See application file for complete search history.

(56) References Cited

U.S. PATENT DOCUMENTS

| | | |
|---|---|---|
| 2012/0315878 A1 | 12/2012 | Deng |
| 2013/0028184 A1* | 1/2013 | Lee ...................... H04W 48/02 370/328 |
| 2013/0122918 A1 | 5/2013 | Boley et al. |
| 2015/0296556 A1 | 10/2015 | Lee et al. |
| 2015/0319801 A1 | 11/2015 | Lee et al. |
| 2018/0270668 A1* | 9/2018 | Nair ...................... H04L 63/205 |
| 2018/0332051 A1* | 11/2018 | Diachina ............. H04W 12/106 |

FOREIGN PATENT DOCUMENTS

| | | |
|---|---|---|
| CN | 104769856 A | 7/2015 |
| CN | 104919735 A | 9/2015 |
| EP | 2523487 A1 | 11/2012 |
| EP | 2611227 A1 | 7/2013 |

OTHER PUBLICATIONS

1st Chinese Office Action for Chinese Application No. 201710671789.7, dated Jan. 19, 2020 (Jan. 19, 2020)—10 pages (English translation—10 pages).

Extended European Search Report for European Application No. 18843235.5, dated Jul. 17, 2020 (Jul. 17, 2020)—9 pages.

Huawei, HiSilicon: "Integrity protection and Counter Check Procedure for NR UP," R2-1707429, 3GPP TSG-RAN WG3#NR2 Ad-Hoc, Qingdao, China, Jun. 27, 2017, 2 pages.

International Search Report and Written Opinion for International Application No. PCT/CN2018/098008, dated Feb. 20, 2020 (Feb. 20, 2020)—9 pages (English translation—5 pages).

Nokia: "pCR UP integrity security solution per bearer" S3-171352, 3GPP TSG SA WG3 (Security) Meeting #87, Ljubljana, Slovenia, May 15, 2017, 3 pages.

* cited by examiner sending, by the base station, configuration information for integrity protection to a terminal by a Radio Resource Control (RRC) layer message, wherein the configuration information for integrity protection is used for configuring an integrity protection function for at least one transmission resource used by the terminal in the transmission of service data  — 11

Fig. 1 sending, by the base station, configuration information for integrity protection to a terminal by means of a RRC layer message  — 21 sending, by the base station, activation/deactivation information of the integrity protection function to the terminal, wherein the activation/deactivation information of the integrity protection function is used for activating/deactivating the integrity protection function for the at least one transmission resource configured with the integrity protection function  — 22

Fig. 2

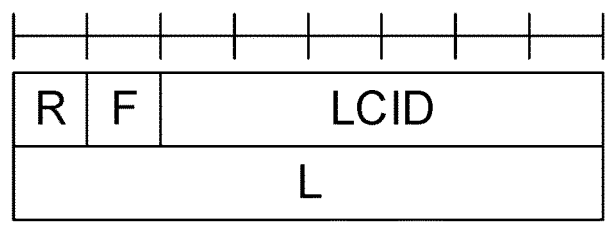

Fig. 3

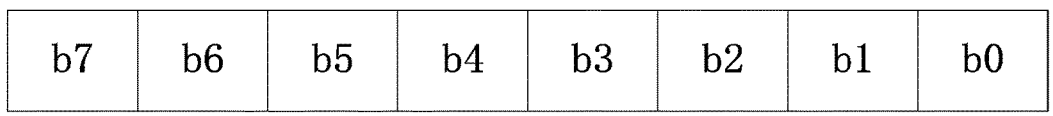

Fig. 4

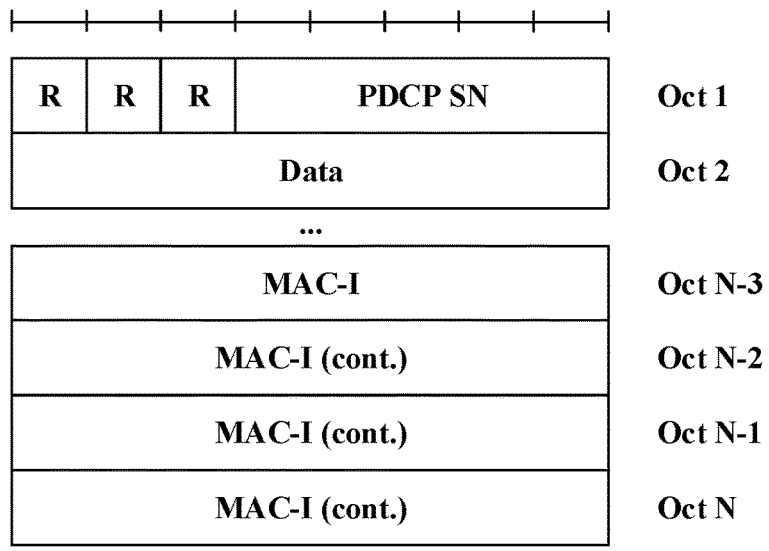

Fig. 5 receiving, by the terminal, configuration information for integrity protection sent by a base station by a RRC layer message, wherein the configuration information for integrity protection is used for configuring an integrity protection function for at least one transmission resource used by the terminal in the transmission of service data — 61 configuring, by the terminal, the integrity protection function for the at least one transmission resource according to the configuration information for integrity protection — 62

Fig. 6 a base station sends configuration information for integrity protection to a terminal by a RRC layer message, wherein the configuration information for integrity protection is used for configuring an integrity protection function for a Data Resource Bearer 1 (DRB1), a DRB2 and a DRB3 used by the terminal in the transmission of service data, the configuration information for integrity protection indicates that an initial state of the integrity protection function of DRB1 is activated, initial states of the integrity protection function of DRB2 and DRB3 are deactivated — 81 the terminal receives the configuration information for integrity protection sent by the base station by the RRC layer message, configures the integrity protection function for the DRB1, the DRB2 and the DRB3, activates the integrity protection function for the DRB1, and records the initial states of the integrity protection function of the DRB2 and the DRB3 as deactivated — 82

Fig. 8 a base station sends configuration information for integrity protection to a terminal by a Radio Resource Control (RRC) layer message, wherein the configuration information for integrity protection is used for configuring an integrity protection function for a DRB1, a DRB2 and a DRB3 used by the terminal in the transmission of service data — 91 the terminal receives the configuration information for integrity protection sent by the base station by the RRC layer message, configures the integrity protection function for the DRB1, the DRB2 and the DRB3, and configures by default an initial state of the integrity protection function of the DRB1, the DRB2 and the DRB3 as activated or deactivated. When the initial state of the integrity protection function of the DRB1, the DRB2 and the DRB3 is configured by default as activated, activating directly the integrity protection function for the DRB1, the DRB2 and the DRB3, when the initial state of the integrity protection function of the DRB1, the DRB2 and the DRB3 is configured by default as deactivated, recording the initial state of the integrity protection function of the DRB1, the DRB2 and the DRB3 as deactivated — 92

Fig. 9

| 121 | a base station sends configuration information for integrity protection to a terminal by a Radio Resource Control (RRC) layer message, wherein the configuration information for integrity protection is used for configuring an integrity protection function for a carrier 1, a carrier 2 and a carrier 3 used by the terminal in the transmission of service data, the configuration information for integrity protection indicates that initial states of the integrity protection function of the carrier 1, the carrier 2 and the carrier 3 are deactivated |

| 122 | the terminal receives the configuration information for integrity protection sent by the base station by the RRC layer message, configures the integrity protection function for the carrier 1, the carrier 2 and the carrier 3, and records the initial state of the integrity protection function of the carrier 1, the carrier 2 and the carrier 3 as deactivated |

| 123 | the base station sends activation/deactivation information of the integrity protection function to the terminal by a MAC layer message, wherein the activation/deactivation information of the integrity protection function is carried by an activation/deactivation MAC CE. b0, b1 and b3 in an bitmap field of the MAC CE correspond to the logical channel 1, the logical channel 2 and the logical channel 3 respectively, and b0, b1 and b3 are respectively 0, 1 and 1 |

| 124 | the terminal receives the activation/deactivation information of the integrity protection function sent by the base station by the MAC layer message, activates the integrity protection function for the carrier 2 and the carrier 3, and keeps the integrity protection function of the carrier 1 deactivated |

Fig. 12 first configuration module — 131

Fig. 13

METHOD AND DEVICE FOR INTEGRITY PROTECTION

CROSS-REFERENCE TO RELATED APPLICATION

This application is the U.S. national phase of PCT Application No. PCT/CN2018/098008 filed on Aug. 1, 2018, which claims priority to Chinese Patent Application No. 201710671789.7 filed in China on Aug. 8, 2017, the disclosures of which are incorporated in their entirety by reference herein.

TECHNICAL FIELD

The present disclosure relates to radio communications technologies, in particular to a method and a device for integrity protection.

BACKGROUND

At present, in a Long Term Evolution (LTE) system, a control plane message of a Radio Resource Control (RRC) layer is encrypted. At the same time, in order to prevent being tampered, an integrity protection is performed on the RRC control plane message. That is to say, integrity verification information (e.g. a token) is carried at the sending side, and the integrity is checked at the receiving side using the integrity verification information.

In the LTE system and a 5g New Radio (NR) system, no integrity protection is performed in the process of sending and receiving service data, so the service data is not prevented from being tampered.

SUMMARY

In a first aspect, the embodiments of the present disclosure provide a method for integrity protection, applied to a base station, including: sending, by the base station, configuration information for integrity protection to a terminal by a Radio Resource Control (RRC) layer message, wherein the configuration information for integrity protection is used for configuring an integrity protection function for at least one transmission resource used by the terminal in the transmission of service data.

In a second aspect, the embodiments of the present disclosure provide a method for integrity protection, applied to a terminal, including: receiving, by the terminal, configuration information for integrity protection sent by a base station by a Radio Resource Control (RRC) layer message, wherein the configuration information for integrity protection is used for configuring an integrity protection function for at least one transmission resource used by the terminal in the transmission of service data; and configuring, by the terminal, the integrity protection function for the at least one transmission resource according to the configuration information for integrity protection.

In a third aspect, the embodiments of the present disclosure provide a base station, including: a first configuration module, for sending configuration information for integrity protection to a terminal by a Radio Resource Control (RRC) layer message, wherein the configuration information for integrity protection is used for configuring an integrity protection function for at least one transmission resource used by the terminal in the transmission of service data.

In a fourth aspect, the embodiments of the present disclosure provide a terminal, including:

a first receiving module, for receiving configuration information for integrity protection sent by a base station by a Radio Resource Control (RRC) layer message, wherein the configuration information for integrity protection is used for configuring an integrity protection function for at least one transmission resource used by the terminal in the transmission of service data; and a configuration module, for configuring the integrity protection function for the at least one transmission resource according to the configuration information for integrity protection.

In a fifth aspect, the embodiments of the present disclosure provide a base station, including: a memory, a processor, and a computer program stored in the memory and capable of being executed by the processor, the processor is configured to execute the computer program to perform the method for integrity protection applied to the base station.

In a sixth aspect, the embodiments of the present disclosure provide a terminal, including: a memory, a processor, and a computer program stored in the memory and capable of being executed by the processor, the processor is configured to execute the computer program to perform the method for integrity protection applied to the terminal.

In a seventh aspect, the embodiments of the present disclosure provide a computer readable medium on which is stored a computer program to be executed by a processor to perform the method for integrity protection applied to the base station.

In an eighth aspect, the embodiments of the present disclosure provide a computer readable medium on which is stored a computer program to be executed by a processor to perform the method for integrity protection applied to the terminal.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain other drawings without any creative effort.

FIG. 1 is a schematic diagram illustrating a method for integrity protection according to a first embodiment of the present disclosure;

FIG. 2 is a schematic diagram illustrating a method for integrity protection according to a second embodiment of the present disclosure;

FIG. 3 is a schematic diagram illustrating a sub-header of an activation/deactivation MAC control element according to one embodiment of the present disclosure;

FIG. 4 is a schematic diagram illustrating a bitmap field of an activation/deactivation MAC control element according to one embodiment of the present disclosure;

FIG. 5 is a schematic diagram illustrating service data packet according to one embodiment of the present disclosure;

FIG. 6 is a schematic diagram illustrating a method for integrity protection according to a third embodiment of the present disclosure;

FIG. 8 is a schematic diagram illustrating a method for integrity protection according to a fifth embodiment of the present disclosure;

FIG. 9 is a schematic diagram illustrating a method for integrity protection according to a sixth embodiment of the present disclosure;

FIG. 12 is a schematic diagram illustrating a method for integrity protection according to a ninth embodiment of the present disclosure;

FIG. 13 is a schematic diagram illustrating a base station according to a tenth embodiment of the present disclosure;

DETAILED DESCRIPTION

Figure 7:
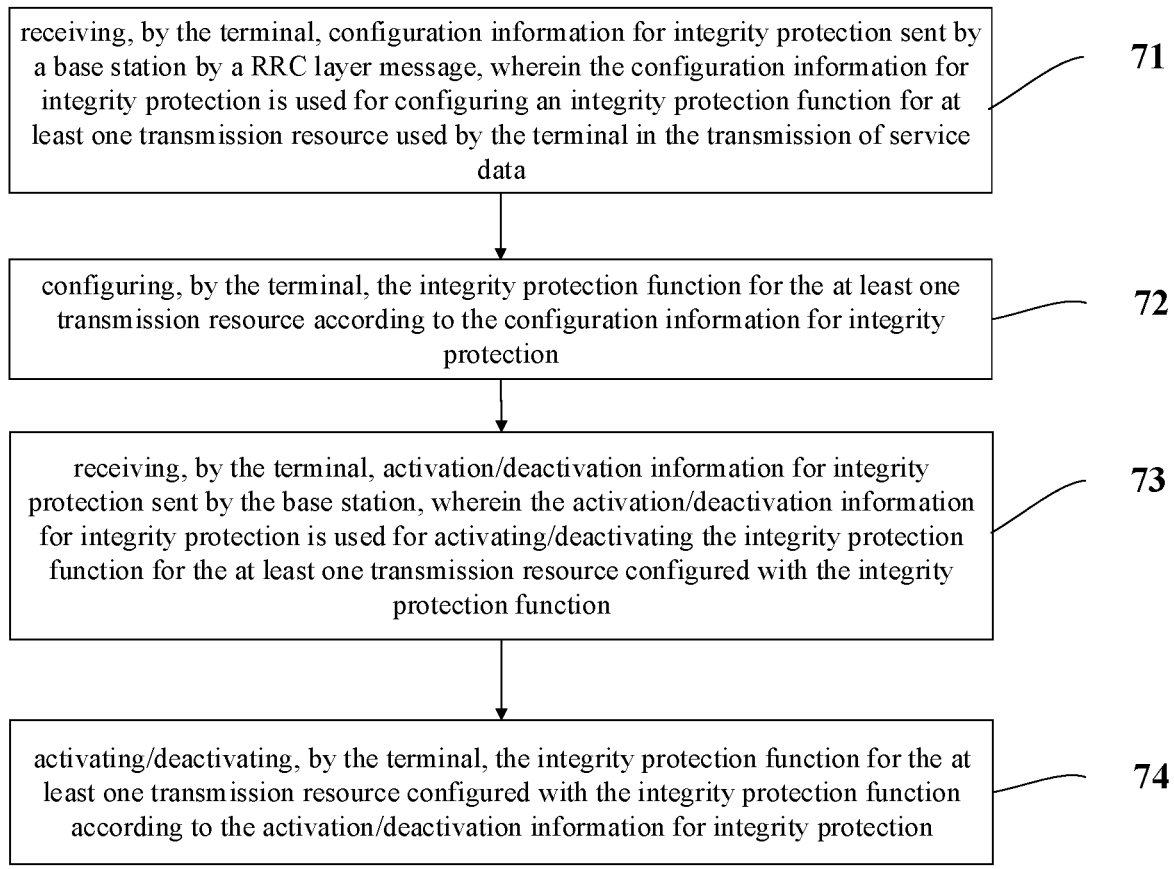
FIG. 7 is a schematic diagram illustrating a method for integrity protection according to a fourth embodiment of the present disclosure.

In order to make an objective, a technical solution and an advantage of the present disclosure clearer, the technical solutions in the embodiments of the present disclosure will be described hereinafter clearly and completely with reference to the drawings of the embodiments of the present disclosure. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In a method and a device for integrity protection according to the embodiments of the present disclosure, an integrity protection function for transmission resources used by a terminal in the transmission of service data is configured, so as to perform an integrity protection for the service data transmitted between the terminal and a base station, prevent the service data from being tampered, and improve a reliability of the service data.

Referring to FIG. 1, FIG. 1 is a schematic diagram illustrating a method for integrity protection according to a first embodiment of the present disclosure, the method for integrity protection is applied to a base station, including:

step 11: sending, by the base station, configuration information for integrity protection to a terminal by a Radio Resource Control (RRC) layer message, wherein the configuration information for integrity protection is used for configuring an integrity protection function for at least one transmission resource used by the terminal in the transmission of service data.

When the transmission resource is configured with the integrity protection function and the integrity protection function is activated, integrity verification information may be carried when the service data is sent. At a receiver, the integrity verification information may be used for checking the integrity of the received service data.

In the embodiments of the present disclosure, the base station sends the configuration information for integrity protection to the terminal, and thus the integrity protection function for the transmission resources used by the terminal in the transmission of service data may be configured, so as to perform the integrity protection for the service data transmitted between the terminal and the base station, prevent the service data from being tampered, and improve the reliability of the service data.

In the embodiment of the present disclosure, the base station may be a Base Transceiver Station (BTS) in a Global System of Mobile communication (GSM) or a Code Division Multiple Access (CDMA), or a NodeB (NB) in a Wideband Code Division Multiple Access (WCDMA), or an Evolutional Node B (eNB or eNodeB) in LTE, or a relay station or a access point, or a base station in a 5G network of the future, etc., which is not limited herein.

In the embodiment of the present disclosure, after sending the configuration information for integrity protection to the terminal by the RRC layer message by the base station, the method for integrity protection further includes: sending, by the base station, deconfiguration information for integrity protection to the terminal by the RRC layer message, wherein the deconfiguration information for integrity protection is used for deconfiguring the integrity protection function for the at least one transmission resource used by the terminal.

In the embodiment of the present disclosure, the transmission resource used by the terminal in the transmission of the service data may include a Data Radio Bearer (DRB), a radio bearer group, a logical channel, a logical channel group, a carrier and/or a carrier group, etc.

The radio bearer group includes at least two data radio bearers; the logical channel group includes at least two logical channels; and the carrier group includes at least two carriers.

The base station may configure the integrity protection function for only one data radio bearer at a time, or configure the integrity protection function for one radio bearer group at a time. Similarly, the base station may configure the integrity protection function for only one logical channel at a time, or configure the integrity protection function for one logical channel group at a time. The base station may configure the integrity protection function for only one carrier at a time, or configure the integrity protection function for one carrier group at a time.

In some optional embodiments of the present disclosure, the configuration information for integrity protection is further used for configuring an initial state of the integrity protection function of the at least one transmission resource as activated or deactivated. Thus, the integrity protection function for the transmission resource may be activated or deactivated as needed.

In some embodiments of the present disclosure, when the base station sends the configuration information for integrity protection to the terminal, the configuration information for integrity protection may indicate whether the initial state of the integrity protection function of the at least one transmission resource is configured to be activated or deactivated. When the configuration information for integrity protection is received, the terminal may configure the initial state of the integrity protection function of the at least one transmission resource as activated or deactivated according to an indication in the configuration information for integrity protection. In the method of the embodiments of the present disclosure, the initial state of each transmission resource may be flexibly configured.

In some other embodiments of the present disclosure, when the base station sends the configuration information for integrity protection to the terminal, the configuration information for integrity protection may not indicate the initial state of the integrity protection function of the at least one transmission resource. When the configuration information for integrity protection is received, the terminal may configure by default the initial state of the integrity protection function of the at least one transmission resource as activated or deactivated. In the method of the embodiment of the present disclosure, a signaling length may be saved.

In some other embodiments of the present disclosure, when the base station sends the configuration information for integrity protection to the terminal, the configuration information for integrity protection may indicate the number of Packet Data Convergence Protocol Protocol Data Units (PDCP PDUs) or Service Data Units (SDUs) which are transmitted on the at least one transmission resource and need integrity protection, or a duration of performing the integrity protection, so that the integrity protection is more flexible. For example, the configuration information for integrity protection indicates that the number of PDCP PDUs which are transmitted on one transmission resource and need integrity protection is 10. When the terminal transmits the service data, the integrity protection may be performed on a first 10 PDCP PDUs while the integrity protection is not needed to be performed on other PDCP PDUs. For another example, the configuration information for integrity protection indicates that the duration of performing the integrity protection on the PDCP PDUs transmitted on one transmission resource is 1 s. When the terminal transmits the service data, the integrity protection may be performed in is while the integrity protection is not needed to be performed on other periods of time.

Referring to FIG. 2, FIG. 2 is a schematic diagram illustrating a method for integrity protection according to a second embodiment of the present disclosure, the method for integrity protection is applied to a base station, including:

step 21: sending, by the base station, configuration information for integrity protection to a terminal by a RRC layer message;

step 22: sending, by the base station, activation/deactivation information of the integrity protection function to the terminal, wherein the activation/deactivation information of the integrity protection function is used for activating/deactivating the integrity protection function for the at least one transmission resource configured with the integrity protection function.

In the embodiment of the present disclosure, the base station sends the activation/deactivation information of the integrity protection function to the terminal, and thus an activation/deactivation state of the integrity protection function for the transmission resource may be flexibly configured.

Specifically, the base station may send the activation/deactivation information of the integrity protection function to the terminal by the RRC layer message, a Media Access Control (MAC) layer message or a physical layer message.

In the embodiment of the present disclosure, the base station may optionally send the activation/deactivation information of the integrity protection function to the terminal by the MAC layer message or the physical layer message due to a large delay of sending the activation/deactivation information of the integrity protection function to the terminal through the RRC layer message.

In the embodiment, when sending the activation/deactivation information of the integrity protection function to the terminal by the MAC layer message by the base station, the activation/deactivation information of the integrity protection function is carried by an activation/deactivation MAC control element.

Referring to FIG. 3, FIG. 3 is a schematic diagram illustrating a sub-header of an activation/deactivation MAC control element according to one embodiment of the present disclosure. It can be seen from FIG. 3, a sub-header of the activation/deactivation MAC control element includes a Logical Channel Identify (LCD) field, and the LCD field is used to indicate that a type of the activation/deactivation MAC control element is the MAC control element used for activating/deactivating the integrity protection function for the transmission resources. In the sub-header of the activation/deactivation MAC CE shown in FIG. 3, L is a length field indicating a length of MAC CE in bytes. A size of the L field is indicated by an F field; F is a format field indicating the size of the length field. A size of the F field may be 1 bit. R is a reserved bit, which may be set as "0".

In the embodiment of the present disclosure, the activation/deactivation MAC control element includes at least one bitmap field carrying the activation/deactivation information of the integrity protection function. Each bit of the bitmap field corresponds to one transmission resource configured with the integrity protection function.

A corresponding relationship between the bit of the bitmap field and the transmission resource may be configured by the base station, or be a fixed positioning relationship between each bit and the transmission resource specified by a protocol. When configured by the base station, the base station may send the corresponding relationship to the terminal through the RRC layer message.

Referring to FIG. 4, FIG. 4 is a schematic diagram illustrating a bitmap field of an activation/deactivation MAC control element according to one embodiment of the present disclosure. In an embodiment of the present disclosure, the bitmap field of the activation/deactivation MAC CE includes eight bits, each bit may be used for carrying the activation/deactivation information of the integrity protection function of one transmission resource configured with the integrity protection function.

In an embodiment of the present disclosure, bit values may be represented by 0 and 1, 0 represents deactivated, 1 represents activated, or on the contrary, 0 represents activated and 1 represents deactivated.

In the embodiment, when sending the activation/deactivation information of the integrity protection function to the terminal by the physical layer message by the base station, the activation/deactivation information of the integrity protection function may be carried by Downlink Control Information (DCI) in a Physical Downlink Control Channel (PDCCH).

Optionally, the DCI in the PDCCH includes at least one bitmap field carrying the activation/deactivation information of the integrity protection function. Each bit of the bitmap field corresponds to one transmission resource configured with the integrity protection function.

A corresponding relationship between the bit of the bitmap field and the transmission resource may be configured by the base station, or be a fixed positioning relationship between each bit and the transmission resource specified by a protocol. When configured by the base station, the base station may send the configuration to the terminal through the RRC layer message.

In the embodiment of the present disclosure, after the base station completes configuring the integrity protection function for the transmission resources used by the terminal in the transmission of the service data, when transmitting the service data between the base station and the terminal, a sender may carry the integrity verification information (e.g., a token) when sending each data packet of the service data, and a receiver uses the received integrity verification information to check the integrity for the service data packet. When the integrity of the service data packet meets a requirement, it is determined that the service data has not been tampered. When the integrity of the service data packet does not meet the requirement, it is determined that the service data has been tampered, thus the security and reliability of the received service data are ensured.

Referring to FIG. 5, FIG. 5 is a schematic diagram illustrating service data packet according to one embodiment of the present disclosure. In FIG. 5, Data is the service data, and MAC-I is the integrity verification information carried by the data packet.

Referring to FIG. 6, FIG. 6 is a schematic diagram illustrating a method for integrity protection according to a third embodiment of the present disclosure, the method for integrity protection is applied to a terminal, including:

step 61: receiving, by the terminal, configuration information for integrity protection sent by a base station by a RRC layer message, wherein the configuration information for integrity protection is used for configuring an integrity protection function for at least one transmission resource used by the terminal in the transmission of service data;

step 62: configuring, by the terminal, the integrity protection function for the at least one transmission resource according to the configuration information for integrity protection.

In the embodiment of the disclosure, the terminal receives the configuration information for integrity protection sent by the base station, and configures the integrity protection function for the transmission resources used by the terminal in the transmission of service data, so as to perform the integrity protection for the service data transmitted between the terminal and the base station, prevent the service data from being tampered, and improve the reliability of the service data.

In the embodiment of the present disclosure, the terminal may be a wireless terminal or a wired terminal, the wireless terminal may be a device providing voice and/or other service data connectivity to a user, a handheld device with a wireless connection function, or another processing device connected to a wireless modem. The wireless terminal may communicate with one or more core networks through a Radio Access Network (RAN). The wireless terminal may be a mobile terminal, such as a mobile phone (or "cellular" phone) and a computer with a mobile terminal such as a portable mobile device, a pocket mobile device, a handheld mobile device, a computer built-in mobile device or a vehicle mounted mobile device, which exchanges languages and/or data with the RAN. For example, the wireless terminal may be a Personal Communication Service (PCS) telephone, a cordless telephone, a Session Initiation Protocol (SIP) telephone, a Wireless Local Loop (WLL) station, a Personal Digital Assistant (PDA) and another device. The wireless terminal may also be referred to as a system, a subscriber unit, a subscriber station, a mobile station, a mobile, a remote station, a remote terminal, an access terminal, a user terminal, a user agent and a user device, which is not limited herein.

In the embodiment of the present disclosure, after receiving the configuration information for integrity protection sent by the base station by the RRC layer message by the terminal, the method further includes:

receiving, by the terminal, deconfiguration information for integrity protection sent by the base station by the RRC layer message, wherein the deconfiguration information for integrity protection is used for deconfiguring the integrity protection function for the at least one transmission resource used by the terminal; and deconfiguring, by the terminal, the integrity protection function for the at least one transmission resource according to the deconfiguration information for integrity protection.

In some embodiments of the present disclosure, the transmission resource used by the terminal in the transmission of service data may include a data radio bearer, a radio bearer group, a logical channel, a logical channel group, a carrier and/or a carrier group, etc.

In some optional embodiments of the present disclosure, the configuration information for integrity protection is further used for configuring an initial state of the integrity protection function of the at least one transmission resource as activated or deactivated.

In some embodiments of the present disclosure, the configuration information for integrity protection may indicate whether the initial state of the integrity protection function of the at least one transmission resource is configured to be activated or to be deactivated.

Then the configuring the integrity protection function for the at least one transmission resource according to the configuration information for integrity protection by the terminal, includes:

when the configuration information for integrity protection indicates that the initial state of the integrity protection function of one transmission resource is activated, activating, by the terminal, the integrity protection function for the corresponding transmission resource;

when the configuration information for integrity protection indicates that the initial state of the integrity protection function of one transmission resource is deactivated, recording, by the terminal, the initial state of the integrity protection function of the corresponding transmission resource as deactivated.

In some other embodiments of the present disclosure, when the base station sends the configuration information for integrity protection to the terminal, the configuration information for integrity protection may not indicate the initial state of the integrity protection function of the at least one transmission resource. When the configuration information for integrity protection is received, the terminal may configure by default the initial state of the integrity protection function of the at least one transmission resource as activated or deactivated.

Then, the configuring the integrity protection function for the at least one transmission resource by the terminal according to the configuration information for integrity protection, includes:

activating, by the terminal, the integrity protection function for the at least one transmission resource while configuring the integrity protection function for the at least one transmission resource according to the configuration information for integrity protection; or recording, by the terminal, the initial state of the integrity protection function of the corresponding transmission resource as deactivated while configuring the integrity protection function for the at least one transmission resource according to the configuration information for integrity protection.

In some other embodiments of the present disclosure, when the base station sends the configuration information for integrity protection to the terminal, the configuration information for integrity protection may indicate the number of Packet Data Convergence Protocol Protocol Data Units (PDCP PDUs) or Service Data Units (SDUs) which are transmitted on the at least one transmission resource and need integrity protection, or a duration of performing the integrity protection, so that the integrity protection is more flexible.

Then the configuring the integrity protection function for the at least one transmission resource according to the configuration information for integrity protection by the terminal, includes:

performing, by the terminal, an integrity protection for the PDCP PDUs or SDUs which are transmitted on the at least one transmission resource and need integrity protection, or performing, by the terminal, an integrity protection for the PDCP PDUs or SDUs transmitted on the at least one transmission resource in the duration.

Referring to FIG. 7, FIG. 7 is a schematic diagram illustrating a method for integrity protection according to a fourth embodiment of the present disclosure, the method for integrity protection is applied to a terminal, including the following steps.

Step 71: receiving, by the terminal, configuration information for integrity protection sent by a base station by a RRC layer message, wherein the configuration information for integrity protection is used for configuring an integrity protection function for at least one transmission resource used by the terminal in the transmission of service data.

Step 72: configuring, by the terminal, the integrity protection function for the at least one transmission resource according to the configuration information for integrity protection.

Step 73: receiving, by the terminal, activation/deactivation information for integrity protection sent by the base station, wherein the activation/deactivation information for integrity protection is used for activating/deactivating the integrity protection function for the at least one transmission resource configured with the integrity protection function.

Step 74: activating/deactivating, by the terminal, the integrity protection function for the at least one transmission resource configured with the integrity protection function according to the activation/deactivation information for integrity protection.

In the embodiment of the present disclosure, the terminal may flexibly configure an activation/deactivation state of the integrity protection function for the transmission resource by receiving the activation/deactivation information of the integrity protection function sent by the base station.

Specifically, the terminal receives the activation/deactivation information of the integrity protection function sent by the base station through the RRC layer message, a MAC layer message or a physical layer message.

In some optional embodiments of the present disclosure, the activating/deactivating the integrity protection function for the at least one transmission resource configured with the integrity protection function by the terminal according to the activation/deactivation information of the integrity protection function, includes: when the activation/deactivation information of the integrity protection function sent by the base station by the MAC layer message is received, obtaining, by the terminal, the activation/deactivation information of the integrity protection function from an activation/deactivation MAC control element of the MAC layer message.

Optionally, the obtaining the activation/deactivation information for integrity protection from the activation/deactivation MAC control element of the MAC layer message by the terminal, includes: identifying, by the terminal, the activation/deactivation MAC control element according to a Logical Channel Identify (LCD) field of a sub-header of the MAC control element of the MAC layer message, and obtaining the activation/deactivation information for integrity protection from a bitmap field of the activation/deactivation MAC control element.

Optionally, each bit of the bitmap field corresponds to one transmission resource configured with the integrity protection function.

In some other optional embodiments of the present disclosure, the activating/deactivating the integrity protection function for the at least one transmission resource configured with the integrity protection function by the terminal according to the activation/deactivation information of the integrity protection function, includes: when the activation/deactivation information of the integrity protection function sent by the base station by the physical layer message is received, obtaining, by the terminal, the activation/deactivation information of the integrity protection function from the physical layer message which is DCI in a Physical Downlink Control Channel (PDCCH).

Optionally, the obtaining the activation/deactivation information of the integrity protection function from the physical layer message, includes: obtaining, by the terminal, the activation/deactivation information of the integrity protection function from a bitmap field of the DCI in the PDCCH.

Optionally, each bit of the bitmap field corresponds to one transmission resource configured with the integrity protection function.

In the embodiment of the present disclosure, after the terminal completes configuring the integrity protection function for the transmission resources used in the transmission of the service data, when transmitting the service data between the base station and the terminal, a sender may carry the integrity verification information (e.g., a token) when sending each data packet of the service data, and a receiver uses the received integrity verification information to check the integrity for the service data packet. When the integrity of the service data packet meets a requirement, it is determined that the service data has not been tampered. When the integrity of the service data packet does not meet the requirement, it is determined that the service data has been tampered, thus the security and reliability of the received service data are ensured.

The method for integrity protection of the embodiments of the present disclosure will be described as follows.

Fifth Embodiment

Referring to FIG. 8, FIG. 8 is a schematic diagram illustrating a method for integrity protection according to a fifth embodiment of the present disclosure, the method for integrity protection includes the following steps.

Step 81: a base station sends configuration information for integrity protection to a terminal by a RRC layer message, wherein the configuration information for integrity protection is used for configuring an integrity protection function for a Data Resource Bearer 1 (DRB1), a DRB2 and a DRB3 used by the terminal in the transmission of service data, the configuration information for integrity protection indicates that the initial state of the integrity protection function of DRB1 is activated, and the initial states of the integrity protection function of DRB2 and DRB3 are deactivated.

Step 82: the terminal receives the configuration information for integrity protection sent by the base station by the RRC layer message, configures the integrity protection function for the DRB1, the DRB2 and the DRB3, activates the integrity protection function for the DRB1, and records the initial states of the integrity protection function of the DRB2 and the DRB3 as deactivated.

Sixth Embodiment

Referring to FIG. 9, FIG. 9 is a schematic diagram illustrating a method for integrity protection according to a sixth embodiment of the present disclosure, the method for integrity protection includes the following steps.

Step 91: a base station sends configuration information for integrity protection to a terminal by a Radio Resource Control (RRC) layer message, wherein the configuration information for integrity protection is used for configuring an integrity protection function for a DRB1, a DRB2 and a DRB3 used by the terminal in the transmission of service data.

Step 92: the terminal receives the configuration information for integrity protection sent by the base station by the RRC layer message, configures the integrity protection function for the DRB1, the DRB2 and the DRB3, and configures by default an initial state of the integrity protection function of the DRB1, the DRB2 and the DRB3 as activated or deactivated. When the initial state of the integrity protection function of the DRB1, the DRB2 and the DRB3 is configured by default as activated, activating directly the integrity protection function for the DRB1, the DRB2 and the DRB3, when the initial state of the integrity protection function of the DRB1, the DRB2 and the DRB3 is configured by default as deactivated, recording the initial state of the integrity protection function of the DRB1, the DRB2 and the DRB3 as deactivated.

Seventh Embodiment

Figure 10:
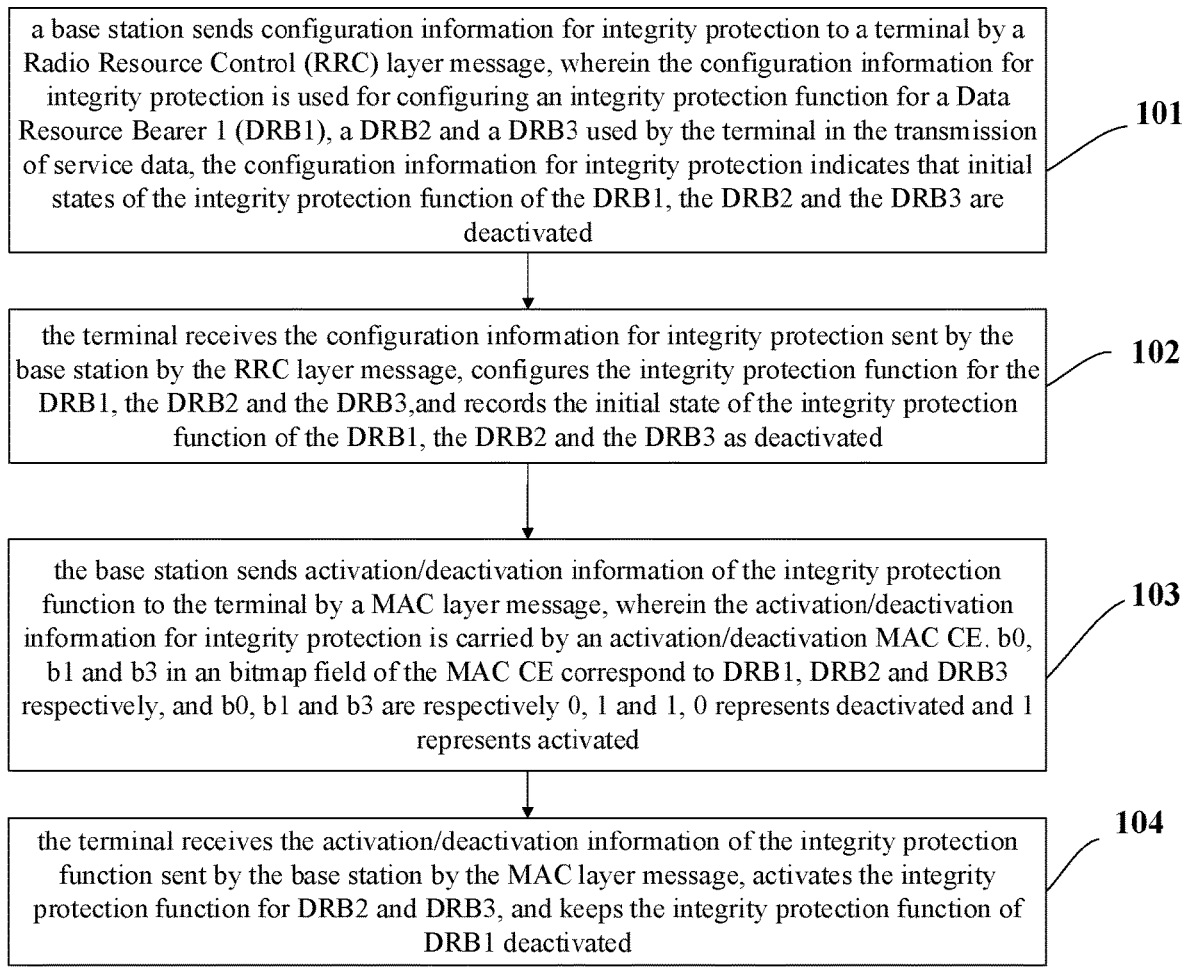
FIG. 10 is a schematic diagram illustrating a method for integrity protection according to a seventh embodiment of the present disclosure.

Referring to FIG. 10, FIG. 10 is a schematic diagram illustrating a method for integrity protection according to a seventh embodiment of the present disclosure, the method for integrity protection includes the following steps.

Step 101: a base station sends configuration information for integrity protection to a terminal by a Radio Resource Control (RRC) layer message, wherein the configuration information for integrity protection is used for configuring an integrity protection function for a Data Resource Bearer 1 (DRB1), a DRB2 and a DRB3 used by the terminal in the transmission of service data, the configuration information for integrity protection indicates that the initial states of the integrity protection function of the DRB1, the DRB2 and the DRB3 are deactivated.

Step 102: the terminal receives the configuration information for integrity protection sent by the base station by the RRC layer message, configures the integrity protection function for the DRB1, the DRB2 and the DRB3, and records the initial state of the integrity protection function of the DRB1, the DRB2 and the DRB3 as deactivated.

Step 103: the base station sends activation/deactivation information of the integrity protection function to the terminal by a MAC layer message, wherein the activation/deactivation information for integrity protection is carried by an activation/deactivation MAC CE. b0, b1 and b3 in an bitmap field of the MAC CE correspond to DRB1, DRB2 and DRB3 respectively, and b0, b1 and b3 are respectively 0, 1 and 1, 0 represents deactivated and 1 represents activated.

Step 104: the terminal receives the activation/deactivation information of the integrity protection function sent by the base station by the MAC layer message, activates the integrity protection function for DRB2 and DRB3, and keeps the integrity protection function of DRB1 deactivated.

Eighth Embodiment

Figure 11:
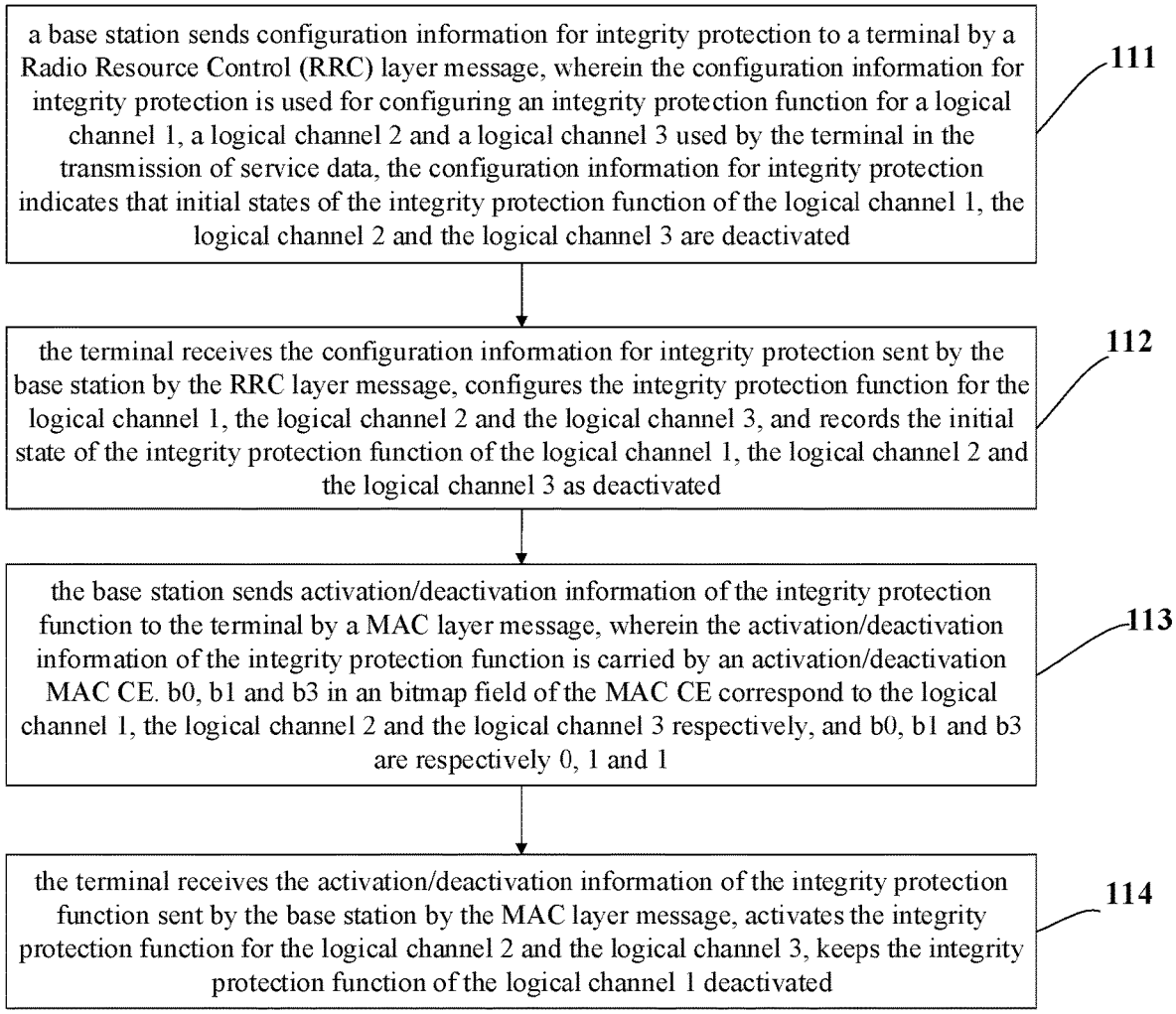
FIG. 11 is a schematic diagram illustrating a method for integrity protection according to an eighth embodiment of the present disclosure.

Referring to FIG. 11, FIG. 11 is a schematic diagram illustrating a method for integrity protection according to an eighth embodiment of the present disclosure, the method for integrity protection includes the following steps.

Step 111: a base station sends configuration information for integrity protection to a terminal by a Radio Resource Control (RRC) layer message, wherein the configuration information for integrity protection is used for configuring an integrity protection function for a logical channel 1, a logical channel 2 and a logical channel 3 used by the terminal in the transmission of service data, the configuration information for integrity protection indicates that initial states of the integrity protection function of the logical channel 1, the logical channel 2 and the logical channel 3 are deactivated.

Step 112: the terminal receives the configuration information for integrity protection sent by the base station by the RRC layer message, configures the integrity protection function for the logical channel 1, the logical channel 2 and the logical channel 3, and records the initial state of the integrity protection function of the logical channel 1, the logical channel 2 and the logical channel 3 as deactivated.

Step 113: the base station sends activation/deactivation information of the integrity protection function to the terminal by a MAC layer message, wherein the activation/deactivation information of the integrity protection function is carried by an activation/deactivation MAC CE. b0, b1 and b3 in an bitmap field of the MAC CE correspond to the logical channel 1, the logical channel 2 and the logical channel 3 respectively, and b0, b1 and b3 are respectively 0, 1 and 1, 0 represents deactivated and 1 represents activated.

Step 114: the terminal receives the activation/deactivation information of the integrity protection function sent by the base station by the MAC layer message, activates the integrity protection function for the logical channel 2 and the logical channel 3, keeps the integrity protection function of the logical channel 1 deactivated.

Ninth Embodiment

Referring to FIG. 12, FIG. 12 is a schematic diagram illustrating a method for integrity protection according to a ninth embodiment of the present disclosure, the method for integrity protection includes the following steps.

Step 121: a base station sends configuration information for integrity protection to a terminal by a Radio Resource Control (RRC) layer message, wherein the configuration information for integrity protection is used for configuring an integrity protection function for a carrier 1, a carrier 2 and a carrier 3 used by the terminal in the transmission of service data, the configuration information for integrity protection indicates that initial states of the integrity protection function of the carrier 1, the carrier 2 and the carrier 3 are deactivated.

Step 122: the terminal receives the configuration information for integrity protection sent by the base station by the RRC layer message, configures the integrity protection function for the carrier 1, the carrier 2 and the carrier 3, and records the initial state of the integrity protection function of the carrier 1, the carrier 2 and the carrier 3 as deactivated.

Step 123: the base station sends activation/deactivation information of the integrity protection function to the terminal by a MAC layer message, wherein the activation/deactivation information of the integrity protection function is carried by an activation/deactivation MAC CE. b0, b1 and b3 in an bitmap field of the MAC CE correspond to the logical channel 1, the logical channel 2 and the logical channel 3 respectively, and b0, b1 and b3 are respectively 0, 1 and 1, 0 represents deactivated and 1 represents activated.

Step 124: the terminal receives the activation/deactivation information of the integrity protection function sent by the base station by the MAC layer message, activates the integrity protection function for the carrier 2 and the carrier 3, and keeps the integrity protection function of the carrier 1 deactivated.

Based on a same concept of invention, a base station is provided according to the embodiments of the present disclosure, referring to FIG. 13, FIG. 13 is a schematic diagram illustrating a base station according to a tenth embodiment of the present disclosure, the base station includes:

a first configuration module 131, for sending configuration information for integrity protection to a terminal by a Radio Resource Control (RRC) layer message, wherein the configuration information for integrity protection is used for configuring an integrity protection function for at least one transmission resource used by the terminal in the transmission of service data.

In the embodiment of the disclosure, the base station sends the configuration information for integrity protection to the terminal, and thus the integrity protection function for the transmission resources used by the terminal in the transmission of service data may be configured, so as to perform the integrity protection for the service data transmitted between the terminal and the base station, prevent the service data from being tampered, and improve the reliability of the service data.

In the embodiment of the present disclosure, the transmission resource includes a data radio bearer, a radio bearer group, a logical channel, a logical channel group, a carrier and/or a carrier group, etc.

In some optional embodiments of the present disclosure, the configuration information for integrity protection is further used for configuring an initial state of the integrity protection function of the at least one transmission resource as activated or deactivated.

In some optional embodiments of the present disclosure, the configuration information for integrity protection is further used for configuring the number of Packet Data Convergence Protocol Protocol Data Units (PDCP PDUs) or Service Data Units (SDUs) which are transmitted on the at least one transmission resource and need integrity protection, or a duration of performing the integrity protection.

Figure 14:
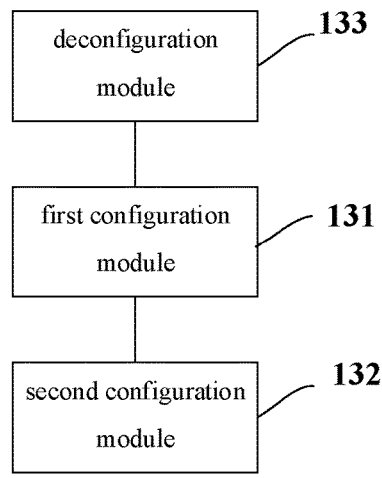
FIG. 14 is a schematic diagram illustrating a base station according to a eleventh embodiment of the present disclosure.

Referring to FIG. 14, FIG. 14 is a schematic diagram illustrating a base station according to an eleventh embodiment of the present disclosure, the base station includes a first configuration module 131 and a second configuration module 132.

The first configuration module 131 is used to send configuration information for integrity protection to a terminal by a Radio Resource Control (RRC) layer message, wherein the configuration information for integrity protection is used for configuring an integrity protection function for at least one transmission resource used by the terminal in the transmission of service data.

The second configuration module 132 is used to send the activation/deactivation information of the integrity protection function to the terminal by the RRC layer message, a Media Access Control (MAC) layer message or a physical layer message, wherein the activation/deactivation information of the integrity protection function is used for activating/deactivating the integrity protection function for the at least one transmission resource configured with the integrity protection function.

Optionally, when the second configuration module 132 sending the activation/deactivation information of the integrity protection function to the terminal by the MAC layer message, the activation/deactivation information of the integrity protection function is carried by an activation/deactivation MAC control element.

Optionally, a sub-header of the activation/deactivation MAC control element includes a Logical Channel Identify (LCID) field, the LCID field indicates that a type of the activation/deactivation MAC control element is the MAC control element used for activating/deactivating the integrity protection function for the transmission resources, the activation/deactivation MAC control element includes at least one bitmap field carrying the activation/deactivation information of the integrity protection function.

Optionally, each bit of the bitmap field corresponds to one transmission resource configured with the integrity protection function.

Optionally, when the second configuration module 132 sending the activation/deactivation information of the integrity protection function to the terminal by the physical layer message, the activation/deactivation information of the integrity protection function is carried by Downlink Control Information (DCI) in a Physical Downlink Control Channel (PDCCH).

Optionally, the DCI in the PDCCH includes at least one bitmap field carrying the activation/deactivation information of the integrity protection function.

Optionally, each bit of the bitmap field corresponds to one transmission resource configured with the integrity protection function.

The base station in the embodiment of the present disclosure may further include:

a deconfiguration module 133, for sending deconfiguration information for integrity protection to the terminal by the RRC layer message, wherein the deconfiguration information for integrity protection is used for deconfiguring the integrity protection function for the at least one transmission resource used by the terminal.

Figure 15:
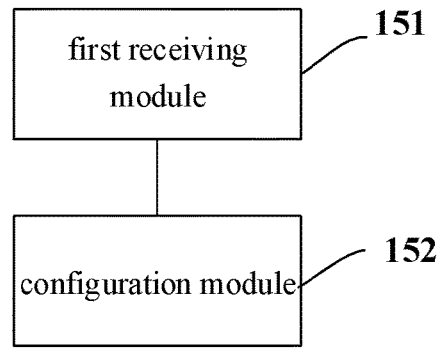
FIG. 15 is a schematic diagram illustrating a terminal according to a twelfth embodiment of the present disclosure.

Referring to FIG. 15, FIG. 15 is a schematic diagram illustrating a terminal according to a twelfth embodiment of the present disclosure, the terminal includes:

a first receiving module 151, for receiving configuration information for integrity protection sent by a base station by a Radio Resource Control (RRC) layer message, wherein the configuration information for integrity protection is used for configuring an integrity protection function for at least one transmission resource used by the terminal in the transmission of service data; and a configuration module 152, for configuring the integrity protection function for the at least one transmission resource according to the configuration information for integrity protection.

In the embodiment of the disclosure, the terminal receives the configuration information for integrity protection sent by the base station, and configures the integrity protection function for the transmission resources used by the terminal in the transmission of service data, so as to perform the integrity protection for the service data transmitted between the terminal and the base station, prevent the service data from being tampered, and improve the reliability of the service data.

In the embodiment of the present disclosure, the transmission resource used by the terminal in the transmission of service data includes a data radio bearer, a radio bearer group, a logical channel, a logical channel group, a carrier and/or a carrier group, etc.

In some optional embodiments of the present disclosure, the configuration information for integrity protection is further used for configuring an initial state of the integrity protection function of the at least one transmission resource as activated or deactivated.

In some embodiments of the present disclosure, the configuration information for integrity protection may indicate whether the initial state of the integrity protection function of the at least one transmission resource is configured to be activated or to be deactivated. Then the configuration module 152 is further used to activate the integrity protection function for the corresponding transmission resource when the configuration information for integrity protection indicates that the initial state of the integrity protection function of one transmission resource is activated; and to record the initial state of the integrity protection function of the corresponding transmission resource as deactivated when the configuration information for integrity protection indicates that the initial state of the integrity protection function of one transmission resource is deactivated.

In some other embodiments of the disclosure, when the base station sends the configuration information for integrity protection to the terminal, it may not indicate the initial state of the integrity protection function of the at least one transmission resource in the configuration information for integrity protection. When the configuration information for integrity protection is received, the terminal configures by default the initial state of the integrity protection function of the at least one transmission resource as activated or deactivated. Then the configuration module 152 is further used to activate the integrity protection function for the at least one transmission resource while configuring the integrity protection function for the at least one transmission resource according to the configuration information for integrity protection; or record an initial state of the integrity protection function of the corresponding transmission resource as deactivated while configuring the integrity protection function for the at least one transmission resource according to the configuration information for integrity protection.

In some other embodiments of the present disclosure, when the base station sends the configuration information for integrity protection to the terminal, the configuration information for integrity protection may indicate the number of Packet Data Convergence Protocol Protocol Data Units (PDCP PDUs) or Service Data Units (SDUs) which are transmitted on the at least one transmission resource and need integrity protection, or a duration of performing the integrity protection, so that the integrity protection is more flexible. Then the configuration module 152 is further used to perform the integrity protection for the PDCP PDUs or SDUs which are transmitted on the at least one transmission resource and need integrity protection, or perform the integrity protection for the PDCP PDUs or SDUs transmitted on the at least one transmission resource in the duration.

Figure 16:
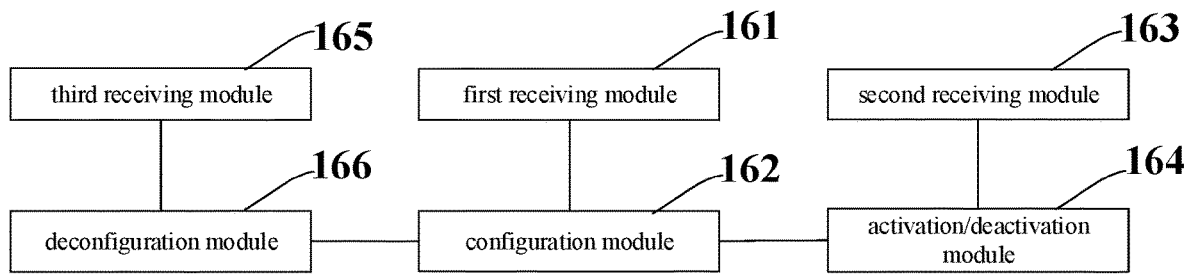
FIG. 16 is a schematic diagram illustrating a terminal according to a thirteenth embodiment of the present disclosure.

Referring to FIG. 16, FIG. 16 is a schematic diagram illustrating a terminal according to a thirteenth embodiment of the present disclosure, the terminal includes:

a first receiving module 161, for receiving configuration information for integrity protection sent by a base station by a RRC layer message, wherein the configuration information for integrity protection is used for configuring an integrity protection function for at least one transmission resource used by the terminal in the transmission of service data;

a configuration module 162, for configuring the integrity protection function for the at least one transmission resource according to the configuration information for integrity protection;

a second receiving module 163, for receiving the activation/deactivation information of the integrity protection function sent by the base station by the RRC layer message, a Media Access Control (MAC) layer message or a physical layer message, wherein the activation/deactivation information of the integrity protection function is used for activating/deactivating the integrity protection function for the at least one transmission resource configured with the integrity protection function; and an activation/deactivation module 164, for activating/deactivating the integrity protection function for the at least one transmission resource configured with the integrity protection function according to the activation/deactivation information of the integrity protection function.

In the embodiments of the present disclosure, the terminal may flexibly configure an activation/deactivation state of the integrity protection function for the transmission resource by receiving the activation/deactivation information of the integrity protection function sent by the base station.

In some optional embodiments of the present disclosure, the activation/deactivation module 164 is further used to obtain the activation/deactivation information of the integrity protection function from an activation/deactivation MAC control element of the MAC layer message when the activation/deactivation information of the integrity protection function sent by the base station by the MAC layer message is received.

Optionally, the activation/deactivation module 164 is further used to identify the activation/deactivation MAC control element according to a Logical Channel Identify (LCD) field of a sub-header of the MAC control element of the MAC layer message, and obtain the activation/deactivation information of the integrity protection function from a bitmap field of the activation/deactivation MAC control element.

Optionally, each bit of the bitmap field corresponds to one transmission resource configured with the integrity protection function.

In some optional embodiments of the present disclosure, the activation/deactivation module 164 is further used to obtain the activation/deactivation information of the integrity protection function from the physical layer message which is DCI in a PDCCH when the activation/deactivation information of the integrity protection function sent by the base station by the physical layer message is received.

Optionally, the activation/deactivation module is further used to obtain the activation/deactivation information of the integrity protection function from a bitmap field of the DCI in the PDCCH.

Optionally, each bit of the bitmap field corresponds to one transmission resource configured with the integrity protection function.

The base station in the embodiment of the present disclosure may further include:

a third receiving module 165, for receiving deconfiguration information for integrity protection sent by the base station by the RRC layer message, wherein the deconfiguration information for integrity protection is used for deconfiguring the integrity protection function for the at least one transmission resource used by the terminal; and a deconfiguration module 166, for deconfiguring the integrity protection function for the at least one transmission resource according to the deconfiguration information for integrity protection.

A base station is provided in the embodiments of the present disclosure, the base station includes: a memory, a processor, and a computer program stored in the memory and capable of being executed by the processor, the processor is configured to execute the computer program to perform the method for integrity protection applied to the base station described above.

A terminal is provided in the embodiments of the present disclosure, the terminal includes: a processor, and a computer program stored in the memory and capable of being executed by the processor, the processor is configured to execute the computer program to perform the method for integrity protection applied to the terminal described above.

A computer readable medium is provided in the embodiments of the present disclosure, a computer program is stored on the computer readable medium to be executed by a processor to perform the method for integrity protection applied to the base station described above. The computer readable medium may be a Read Only Memory (ROM), a Random Access Memory (RAM), a magnetic disk or an optical disk, etc.

A computer readable medium is provided in the embodiments of the present disclosure, a computer program is stored on the computer readable medium to be executed by a processor to perform the method for integrity protection applied to the terminal described above. The computer readable medium may be a Read Only Memory (ROM), a Random Access Memory (RAM), a magnetic disk or an optical disk, etc.

Figure 17:
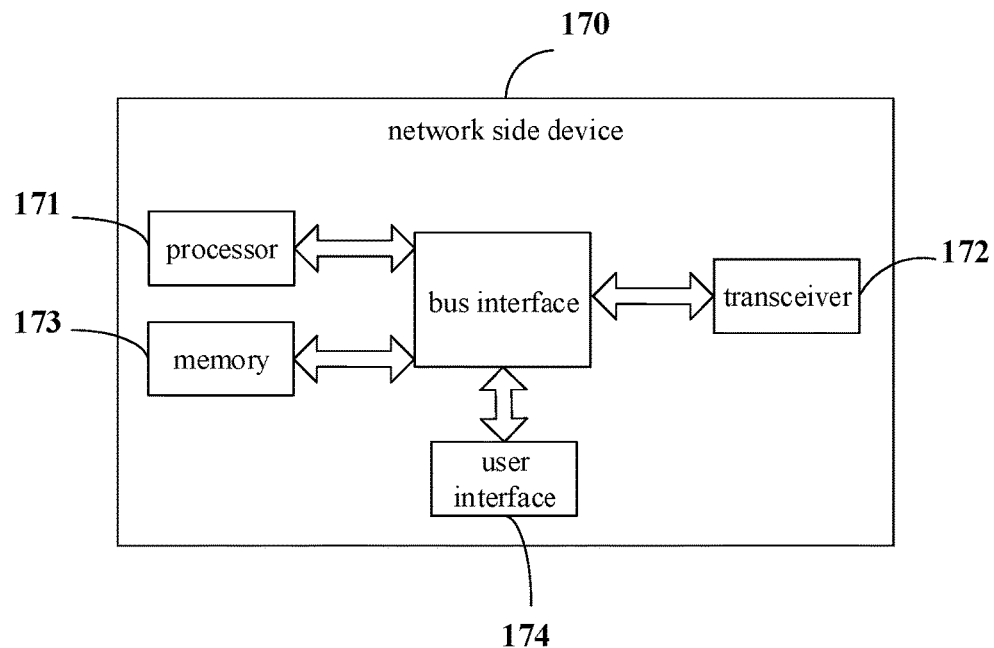
FIG. 17 is a schematic diagram illustrating a base station according to a fourteenth embodiment of the present disclosure.

Referring to FIG. 17, FIG. 17 is a schematic diagram illustrating a base station according to a fourteenth embodiment of the present disclosure. It may realize the details of the method for integrity protection applied to the base station and achieve the same effect. As shown in FIG. 17, a network side device 170 includes a processor 171, a transceiver 172, a memory 173, a user interface 174, and a bus interface.

In the embodiment of the present disclosure, the network side device 170 further includes: a computer program stored in the memory 173 and capable of being executed by the processor 171. When the computer program is executed by the processor 171, the following steps are performed: sending configuration information for integrity protection to a terminal by a RRC layer message, wherein the configuration information for integrity protection is used for configuring an integrity protection function for at least one transmission resource used by the terminal in the transmission of service data.

In FIG. 17, a bus architecture may include arbitrary number of interconnected buses and bridges, specifically, various circuits, such as one or more processors represented by the processor 171 and the memory represented by the memory 173, are linked to form the bus architecture. In the bus architecture, other various circuits such as peripherals, voltage regulators, and power management circuits, may further be linked, which is well known in the art and, therefore, will not be further described herein. The bus interface provides an interface. The transceiver 172 may be a plurality of components, including a transmitter and a receiver, providing units communicating with other various devices on a transmission medium. For different user equipment, the user interface 174 may also be an interface capable of connecting required devices externally or internally. The device includes, but is not limited to, a keypad, a display, a speaker, a microphone, a joystick, and the like.

The processor 171 is in charge of managing the bus architecture and a general processing, and the memory 173 may store the data used by the processor 171 in performing the operation.

Optionally, the transmission resource includes a data radio bearer, a radio bearer group, a logical channel, a logical channel group, a carrier and/or a carrier group.

Optionally, the configuration information for integrity protection is further used for configuring an initial state of the integrity protection function of the at least one transmission resource as activated or deactivated.

Optionally, the configuration information for integrity protection is further used for configuring the number of Packet Data Convergence Protocol Protocol Data Units (PDCP PDUs) or Service Data Units (SDUs) which are transmitted on the at least one transmission resource and need integrity protection, or a duration of performing the integrity protection.

Optionally, the processor 171 is further configured to execute the computer program to perform the following step: sending activation/deactivation information of the integrity protection function to the terminal by the RRC layer message, a Media Access Control (MAC) layer message or a physical layer message, wherein the activation/deactivation information of the integrity protection function is used for activating/deactivating the integrity protection function for the at least one transmission resource configured with the integrity protection function.

Optionally, the processor 171 is further configured to execute the computer program to perform the following step: when sending the activation/deactivation information of the integrity protection function to the terminal by the MAC layer message by the base station, the activation/deactivation information of the integrity protection function is carried by an activation/deactivation MAC control element.

Optionally, a sub-header of the activation/deactivation MAC control element includes a Logical Channel Identify (LCID) field, the LCID field indicates that a type of the activation/deactivation MAC control element is the MAC control element used for activating/deactivating the integrity protection function for the transmission resources, the activation/deactivation MAC control element includes at least one bitmap field carrying the activation/deactivation information of the integrity protection function.

Optionally, the processor 171 is further configured to execute the computer program to perform the following step: when sending the activation/deactivation information of the integrity protection function to the terminal by the physical layer message by the base station, the activation/deactivation information of the integrity protection function is carried by Downlink Control Information (DCI) in a Physical Downlink Control Channel (PDCCH).

Optionally, the DCI in the PDCCH comprises at least one bitmap field carrying the activation/deactivation information of the integrity protection function.

Optionally, each bit of the bitmap field corresponds to one transmission resource configured with the integrity protection function.

In the embodiment of the disclosure, the base station sends the configuration information for integrity protection to the terminal, and configures the integrity protection function for the transmission resources used by the terminal in the transmission of service data, so as to perform the integrity protection for the service data transmitted between the terminal and the base station, prevent the service data from being tampered, and improve the reliability of the service data.

Figure 18:
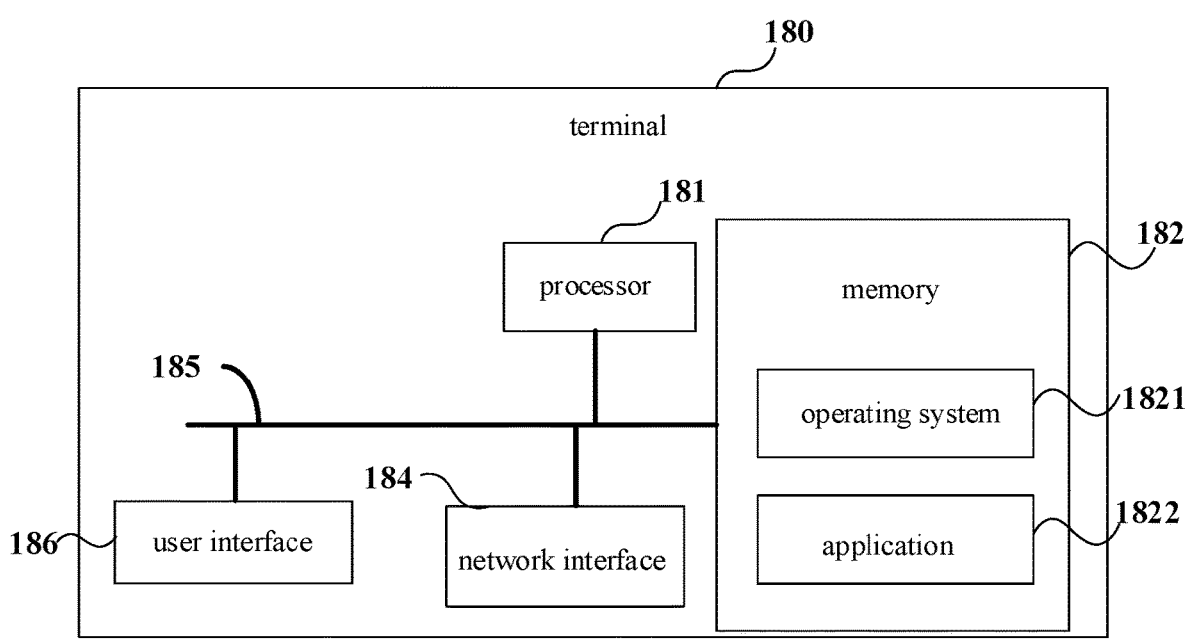
FIG. 18 is a schematic diagram illustrating a terminal according to a fifteenth embodiment of the present disclosure.

Referring to FIG. 18, FIG. 18 is a schematic diagram illustrating a terminal according to a fifth embodiment of the present disclosure. As shown in FIG. 18, a terminal 180 includes: at least one processor 181, a memory 182, at least one network interface 184 and other user interfaces 186. Each component of the terminal 180 is coupled together through a bus system 185. It should be appreciated that, the bus system 185 is used to realize connection communication between these components. The bus system 185 includes not only a data bus, but also a power bus, a control bus and a state signal bus. But for the sake of clarity, in FIG. 18, all kinds of buses are marked as the bus system 185.

The user interface 186 may include a display, a keyboard, or a click device (e.g., a mouse, a track ball, a touch pad, a touch screen, etc.).

It should be appreciated that, the memory 182 in the embodiments of the present disclosure may be a volatile memory or a non-volatile memory, or include both of the volatile memory and the non-volatile memory. The non-volatile memory may be a Read-Only Memory (ROM), a Programmable Read-Only Memory (PROM), an Erasable Programmable Read-Only Memory (EPROM), an Electrically Erasable Programmable Read-Only Memory (EEPROM), or a flash memory. The volatile memory may be a Random Access Memory (RAM), which serves as an external cache. Various RAM are available, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synch Link Dynamic Random Access Memory (SLDRAM) and a Direct Rambus Random Access Memory (DRRAM), which is illustrated by examples, not in a restricting way. The memory 182 of the systems and methods described in the present disclosure is intended to include, but is not limited to, the memory described above and any other suitable types of memories.

In some embodiments, the memory 182 stores following elements, executable modules or data structures, or their subsets, or their extension sets: an operating system 1821 and an application 1822.

The operating system 1821 includes various system programs, such as a framework layer, a core library layer, a driver layer, etc., used for implementing various basic services and dealing with hardware-based tasks. The application 1822 includes various applications, such as a media player, a browser, etc., used for implementing various application services. A program implementing the method of the embodiments of the present disclosure may be included in the application 1822.

The terminal 180 further includes: a computer program stored in the memory 182 and capable of being executed by the processor 181, specifically, the computer program may be a computer program in the application 1822, the processor 181 is configured to execute the computer program to perform the following step:

receiving configuration information for integrity protection sent by a base station by a Radio Resource Control (RRC) layer message, wherein the configuration information for integrity protection is used for configuring an integrity protection function for at least one transmission resource used by the terminal in the transmission of service data; and configuring the integrity protection function for the at least one transmission resource according to the configuration information for integrity protection.

The methods disclosed in the above-mentioned embodiments of the present disclosure may be applied to or implemented by the processor 181. The processor 181 may be an integrated circuit chip capable of processing signals. In an implementation, the steps of the above method may be accomplished implemented by an integrated logic circuit in a form of hardware in the processor 181 or instructions in a form of software. The processor 181 may be a general processor, a Digital Signal Processor (DSP), an Application Specific Integrated Circuit (ASIC), a Field Programmable Gate Array (FPGA) or other programmable logic devices, discrete gates or transistor logic devices, discrete hardware components. The methods, steps and logical block diagrams in the embodiments of the present disclosure may be implemented or executed. The general processor may be a microprocessor or any conventional processor. The steps of the method in the embodiments of the present disclosure may be directly embodied in the execution of a hardware decoding processor or in combination of hardware and software modules in the decoding processor. The software modules may be located in a RAM, a flash memory, a read-only memory, a programmable read-only memory or an electrical erasable programmable memory, a register and other mature known memory media in the art. The storage medium may be located in the memory 182, and the processor 181 reads information in the memory 182, and implements the steps of the above methods with the hardware in the processor 181.

It should be appreciated that, the embodiments described above may be implemented with hardware, software, firmware, middleware, microcode or a combination thereof. For a hardware implementation, a processing unit may be implemented in one or more Application Specific Integrated Circuits (ASICs), Digital Signal Processors (DSPs), Digital Signal Processing Devices (DSPDs), Programmable Logic Devices (PLDs), Field-Programmable Gate Arrays (FPGAs), general processors, controllers, microcontrollers, microprocessors, other electronic units or combinations thereof for performing the functions described in the application.

For a software implementation, the techniques described in the present disclosure may be implemented by modules (such as processes, functions, etc.) performing the functions described in the present disclosure. Software code may be stored in the memory and executed by the processor. The memory may be implemented in or outside the processor.

Optionally, as another embodiment, the transmission resource comprises a data radio bearer, a radio bearer group, a logical channel, a logical channel group, a carrier and/or a carrier group.

Optionally, as another embodiment, the configuration information for integrity protection is further used for configuring an initial state of the integrity protection function of the at least one transmission resource as activated or deactivated; the processor 181 is further configured to execute the computer program to perform the following steps:

when the configuration information for integrity protection indicates that the initial state of the integrity protection function of one transmission resource is activated, activating, by the terminal, the integrity protection function for the corresponding transmission resource;

when the configuration information for integrity protection indicates that the initial state of the integrity protection function of one transmission resource is deactivated, recording, by the terminal, the initial state of the integrity protection function of the corresponding transmission resource as deactivated.

Optionally, as another embodiment, the processor 181 is further configured to execute the computer program to perform the following steps:

activating the integrity protection function for the at least one transmission resource while configuring the integrity protection function for the at least one transmission resource according to the configuration information for integrity protection; or recording an initial state of the integrity protection function of the corresponding transmission resource as deactivated while configuring the integrity protection function for the at least one transmission resource according to the configuration information for integrity protection.

Optionally, as another embodiment, the configuration information for integrity protection is further used for configuring the number of Packet Data Convergence Protocol Protocol Data Units (PDCP PDUs) or Service Data Units (SDUs) which are transmitted on the at least one transmission resource and need integrity protection, or a duration of performing the integrity protection; the processor 181 is further used to execute the computer program to perform the following steps: performing the integrity protection for the PDCP PDUs or SDUs which are transmitted on the at least one transmission resource and need integrity protection, or performing the integrity protection for the PDCP PDUs or SDUs transmitted on the at least one transmission resource in the duration.

Optionally, as another embodiment, the processor 181 is further configured to execute the computer program to perform the following steps:

receiving activation/deactivation information of the integrity protection function sent by the base station by the RRC layer message, a Media Access Control (MAC) layer message or a physical layer message, wherein the activation/deactivation information of the integrity protection function is used for activating/deactivating the integrity protection function for the at least one transmission resource configured with the integrity protection function; and activating/deactivating the integrity protection function for the at least one transmission resource configured with the integrity protection function according to the activation/deactivation information of the integrity protection function.

Optionally, as another embodiment, the processor 181 is further configured to execute the computer program to perform the following step: when the terminal receives the activation/deactivation information of the integrity protection function sent by the base station by the MAC layer message, obtaining the activation/deactivation information of the integrity protection function from an activation/deactivation MAC control element of the MAC layer message.

Optionally, as another embodiment, the processor 181 is further configured to execute the computer program to perform the following steps: identifying the activation/deactivation MAC control element according to a Logical Channel Identify (LCD) field of a sub-header of the MAC control element of the MAC layer message, and obtaining the activation/deactivation information of the integrity protection function from a bitmap field of the activation/deactivation MAC control element.

Optionally, as another embodiment, the processor 181 is further configured to execute the computer program to perform the following steps: when the terminal receives the activation/deactivation information of the integrity protection function sent by the base station by the physical layer message, obtaining the activation/deactivation information of the integrity protection function from the physical layer message which is Downlink Control Information (DCI) in a Physical Downlink Control Channel (PDCCH).

Optionally, as another embodiment, the processor 181 is further configured to execute the computer program to perform the following step: obtaining the activation/deactivation information of the integrity protection function from a bitmap field of the DCI in the PDCCH.

Optionally, as another embodiment, each bit of the bitmap field corresponds to one transmission resource configured with the integrity protection function.

Optionally, as another embodiment, the processor 181 is further configured to execute the computer program to perform the following steps:

receiving deconfiguration information for integrity protection sent by the base station by the RRC layer message, wherein the deconfiguration information for integrity protection is used for deconfiguring the integrity protection function for the at least one transmission resource used by the terminal; and deconfiguring the integrity protection function for the at least one transmission resource according to the deconfiguration information for integrity protection.

The terminal 180 may implement various processes of the terminal implemented in the embodiments described above, which will not be repeated herein for the sake of simplicity.

In the embodiment of the disclosure, the terminal 180 receives the configuration information for integrity protection sent by the base station, and configures the integrity protection function for the transmission resources used by the terminal in the transmission of service data, so as to perform the integrity protection for the service data transmitted between the terminal and the base station, prevent the service data from being tampered, and improve the reliability of the service data.

Figure 19:
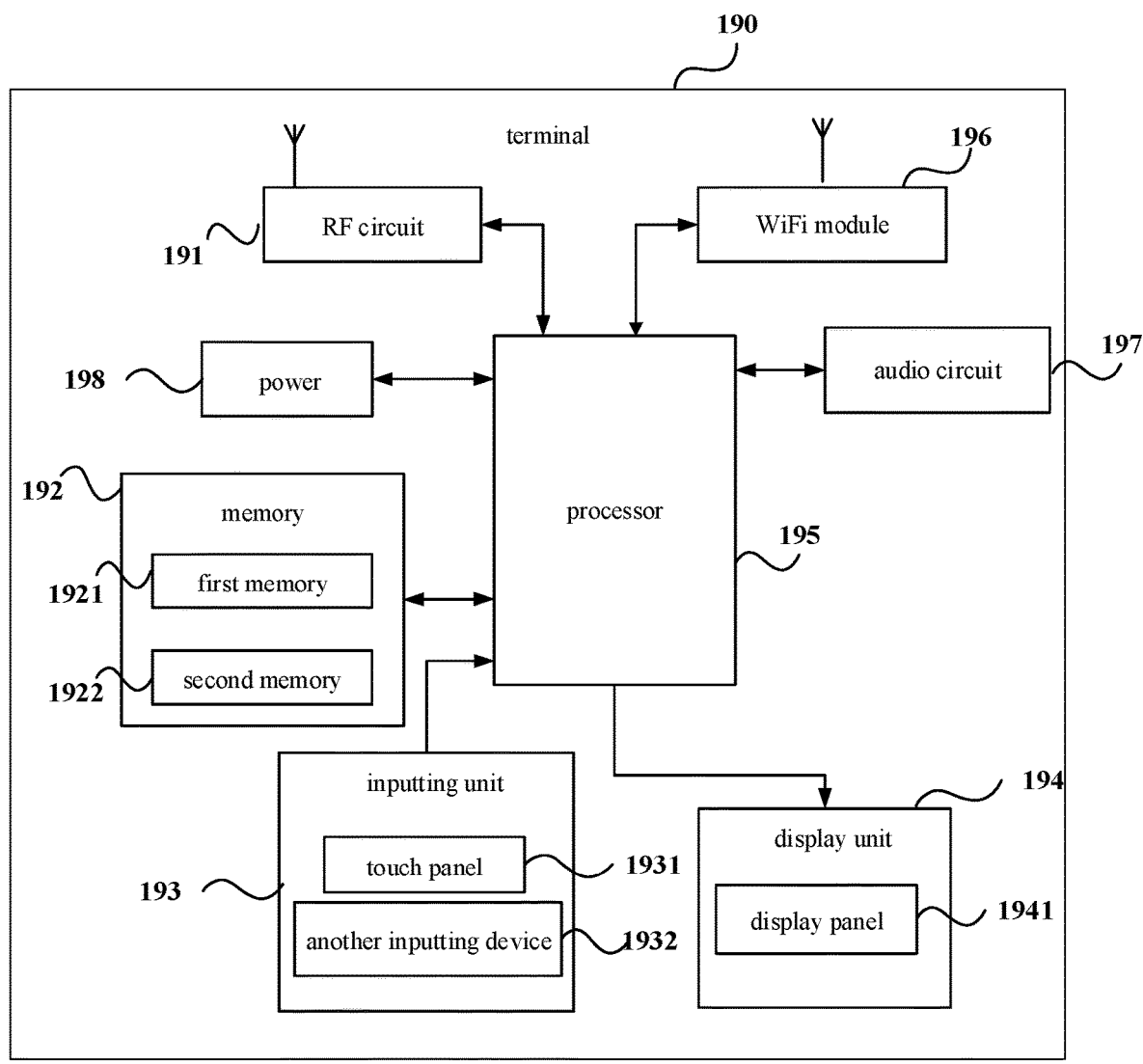
FIG. 19 is a schematic diagram illustrating a terminal according to a sixteenth embodiment of the present disclosure.

Referring to FIG. 19, FIG. 19 is a schematic diagram illustrating a terminal according to a sixteenth embodiment of the present disclosure. Specifically, a terminal 190 in FIG. 19 may be a mobile phone, a tablet computer, a personal digital assistant (PDA), or a vehicle mounted computer, and the like.

The terminal 190 includes a Radio Frequency (RF) circuit 191, a memory 192, an inputting unit 193, a display unit 194, a processor 195, a Wireless Fidelity (Wi-Fi) module 196, an audio circuit 197 and a power 198.

The inputting unit 193 may receive numeral or character information inputted by the user, and generate signal input related with user configuration and function control of the terminal 190.

Specifically, in the embodiments of the present disclosure, the inputting unit 193 may include a touch panel 1931. The touch panel 1931 is also called a touch screen, and may collect a touch operation performed by a user on or near the touch panel 1931 (e.g., the user performs an operation on the touch panel 1931 with any suitable object or accessory such as a finger and a stylus), and drive a corresponding connection device according to a preset program. Optionally, the touch panel 1931 may include a touch detecting device and a touch controller. The touch detecting device may detect a touch position of the user, detect a signal generated based on the touch operation, and transmit the signal to the touch controller. The touch controller may receive touch information from the touch detecting device, convert the touch information into a coordinate of touch point, transmit the coordinate of the touch point to the processor 195, and receive and execute a command sent by the processor 195. In addition, the touch panel 1931 may be implemented by multiple modes such as a resistive mode, a capacitive mode, an infrared mode or a surface acoustic wave mode. Besides the touch panel 1931, the inputting unit 193 may further include another inputting device 1932. The inputting device 1932 may include, but is not limited to, one or more of a physical keyboard, a function key (such as a volume control key, a switch key, etc.), a trackball, a mouse and a joystick.

The display unit 194 may display information inputted by the user or information provided to the user and various menu interfaces of the terminal 190. The display unit 194 may include a display panel 1941, which may be a Liquid Crystal Display (LCD) panel or an Organic Light-Emitting Diode (OLED) panel, so as to configure the display panel 1941.

It should be appreciated that, the touch panel 1931 may cover the display panel 1941 to form a touch display screen. When a touch operation on or near the touch display screen is detected, and the touch operation is transmitted to the processor 195 to determine a type of a touch event. The processor 195 then provides a corresponding visual output on the touch display screen according to the type of the touch event.

The touch display screen includes an application interface display region and a common control display region. The application interface display region and the common control display region may be arranged in various manners, such as an upper and lower alignment, a left and right alignment, or other alignments distinguishing the two display regions. The application interface display region may display an interface of the application. Each interface may include an interface element such as at least one application icon and/or a widget desktop control. The application interface display region may also be an empty interface without any content. The common control display region may display a control with a high usage rate, such as a setting button, an interface number, a scroll bar, a telephone icon and other application icons.

In the embodiments of the present disclosure, the processor 195 is configured to call the software programs and/or the modules stored in a first memory 1921 and/or the data in a second memory 1922 to implement following steps:

receiving configuration information for integrity protection sent by a base station by a Radio Resource Control (RRC) layer message, wherein the configuration information for integrity protection is used for configuring an integrity protection function for at least one transmission resource used by the terminal in the transmission of service data; and configuring the integrity protection function for the at least one transmission resource according to the configuration information for integrity protection.

Optionally, as another embodiment, the transmission resource comprises a data radio bearer, a radio bearer group, a logical channel, a logical channel group, a carrier and/or a carrier group.

Optionally, as another embodiment, the configuration information for integrity protection is further used for configuring an initial state of the integrity protection function of the at least one transmission resource as activated or deactivated; the processor 195 is further configured to execute the computer program to perform the following steps:

when the configuration information for integrity protection indicates that the initial state of the integrity protection function of one transmission resource is activated, activating, by the terminal, the integrity protection function for the corresponding transmission resource;

when the configuration information for integrity protection indicates that the initial state of the integrity protection function of one transmission resource is deactivated, recording, by the terminal, the initial state of the integrity protection function of the corresponding transmission resource as deactivated.

Optionally, as another embodiment, the processor 195 is further configured to execute the computer program to perform the following steps:

activating the integrity protection function for the at least one transmission resource while configuring the integrity protection function for the at least one transmission resource according to the configuration information for integrity protection; or recording an initial state of the integrity protection function of the corresponding transmission resource as deactivated while configuring the integrity protection function for the at least one transmission resource according to the configuration information for integrity protection.

Optionally, as another embodiment, the configuration information for integrity protection is further used for configuring the number of Packet Data Convergence Protocol Protocol Data Units (PDCP PDUs) or Service Data Units (SDUs) which are transmitted on the at least one transmission resource and need integrity protection, or a duration of performing the integrity protection; the processor 195 is further configured to execute the computer program to perform the following steps: performing the integrity protection for the PDCP PDUs or SDUs which are transmitted on the at least one transmission resource and need integrity protection, or performing the integrity protection for the PDCP PDUs or SDUs transmitted on the at least one transmission resource in the duration.

Optionally, as another embodiment, the processor 195 is further configured to execute the computer program to perform the following steps:

receiving activation/deactivation information of the integrity protection function sent by the base station by the RRC layer message, a Media Access Control (MAC) layer message or a physical layer message, wherein the activation/deactivation information of the integrity protection function is used for activating/deactivating the integrity protection function for the at least one transmission resource configured with the integrity protection function; and activating/deactivating the integrity protection function for the at least one transmission resource configured with the integrity protection function according to the activation/deactivation information of the integrity protection function.

Optionally, as another embodiment, the processor 195 is further configured to execute the computer program to perform the following step: when the terminal receives the activation/deactivation information of the integrity protection function sent by the base station by the MAC layer message, obtaining the activation/deactivation information of the integrity protection function from an activation/deactivation MAC control element of the MAC layer message.

Optionally, as another embodiment, the processor 195 is further configured to execute the computer program to perform the following steps: identifying the activation/deactivation MAC control element according to a Logical Channel Identify (LCD) field of a sub-header of the MAC control element of the MAC layer message, and obtaining the activation/deactivation information of the integrity protection function from a bitmap field of the activation/deactivation MAC control element.

Optionally, as another embodiment, the processor 195 is further configured to execute the computer program to perform the following steps: when the terminal receives the activation/deactivation information of the integrity protection function sent by the base station by the physical layer message, obtaining the activation/deactivation information of the integrity protection function from the physical layer message which is Downlink Control Information (DCI) in a Physical Downlink Control Channel (PDCCH).

Optionally, as another embodiment, the processor 195 is further configured to execute the computer program to perform the following step: obtaining the activation/deactivation information of the integrity protection function from a bitmap field of the DCI in the PDCCH.

Optionally, as another embodiment, each bit of the bitmap field corresponds to one transmission resource configured with the integrity protection function.

Optionally, as another embodiment, the processor 195 is further configured to execute the computer program to perform the following steps:

receiving deconfiguration information for integrity protection sent by the base station by the RRC layer message, wherein the deconfiguration information for integrity protection is used for deconfiguring the integrity protection function for the at least one transmission resource used by the terminal; and deconfiguring the integrity protection function for the at least one transmission resource according to the deconfiguration information for integrity protection.

The terminal 190 may implement various processes of the terminal implemented in the embodiments described above, which will not be repeated herein for the sake of simplicity.

In the embodiment of the disclosure, the terminal 190 receives the configuration information for integrity protection sent by the base station, and configures the integrity protection function for the transmission resources used by the terminal in the transmission of service data, so as to perform the integrity protection for the service data transmitted between the terminal and the base station, prevent the service data from being tampered, and improve the reliability of the service data.

A person skilled in the art may understands that, the units and the algorithm steps of the examples in the embodiments of the present disclosure may be implemented in a form of electronic hardware, or combination of the electronic hardware and the computer software. Whether the units and the algorithm steps are implemented in a form of hardware or software depends on specific applications and design constraints of the technical solutions. Professional technicians may use different methods to implement the described functions for each particular application, and the implementations should not be considered beyond the scope of the present disclosure.

A person skilled in the art may clearly understand that for the sake of convenience and simplicity of description, the specific working processes of the systems, devices and units described above may refer to corresponding processes in the embodiments of the methods described above, and will not be repeated herein.

In embodiments of the present disclosure, it should be understood that the disclosed devices and methods may be implemented in other ways. For example, the device embodiments described above are merely illustrative. For example, the division of the units described above is only a logical functional division. In practice, there may be other ways of division, e.g., multiple units or components may be combined or integrated into another system, or some features may be ignored or not implemented. On another hand, a coupling or a direct coupling or a communication connection shown or discussed may be an indirect coupling or a communication connection through some interfaces, devices or units, and may be in electrical, mechanical or other forms.

The unit described as respective separation components may or may not be physically separated, and the component displayed as a unit may or may not be a physical unit, that is, it may be located in one place or may be distributed over multiple network units. Some or all of the units may be selected according to actual needs to achieve the purpose of the solution of the embodiment of the present disclosure.

In addition, the functional units in various embodiments of the present disclosure may be integrated in one processing unit, may be physically present separately from each other, or may be integrated in one unit by two or more units.

When the functions are implemented in the form of software function units and sold or used as an independent product, the functions may be stored in a computer-readable storage medium. Based on the understanding, the technical solution of the present disclosure, or a part of the technical solution contributing to the prior art, or a part of the technical solution, may be embodied in a form of a software product. The computer software product is stored in a storage medium, including several instructions to make a computer device (e.g., a personal computer, a server, or a network device, etc.) perform all or part of the steps of the method described in various embodiments of the present disclosure. The aforementioned storage medium includes: a universal serial bus disk, a mobile hard disk, a ROM, a RAM, a magnetic disk or an optical disk, and another medium that may store program code.

The above are merely embodiments of the present disclosure, but a protection scope of the present disclosure is not limited thereto. It should be appreciated that a person skilled in the art may make further modifications and improvements without departing from the spirit of the present disclosure, and these modifications and improvements shall also fall within the scope of the present disclosure. Therefore, the protection scope of the present disclosure shall be subject to the protection scope of the claims.

What is claimed is:

1. A method for integrity protection, applied to a base station, comprising:
   sending, by the base station, configuration information for integrity protection to a terminal by a Radio Resource Control (RRC) layer message, wherein the configuration information for integrity protection is used for configuring an integrity protection function for at least one transmission resource used by the terminal in a transmission of service data,
   wherein after sending the configuration information for integrity protection to the terminal by the RRC layer message by the base station, the method further comprises:

sending, by the base station, activation/deactivation information of the integrity protection function to the terminal by a RRC layer message, a Media Access Control (MAC) layer message or a physical layer message, wherein the activation/deactivation information of the integrity protection function is used for activating/deactivating the integrity protection function for the at least one transmission resource configured with the integrity protection unction, wherein when sending the activation/deactivation information of the integrity protection function to the terminal by the MAC layer message by the base station, the activation/deactivation information of the integrity protection function is carried by an activation/deactivation MAC control element; or wherein when sending the activation/deactivation information of the integrity protection function to the terminal by the physical layer message by the base station, the activation/deactivation information of the integrity protection function is carried by Downlink Control Information (DCI) in a Physical Downlink Control Channel (PDCCH).

2. The method for integrity protection according to claim 1, wherein the transmission resource comprises a data radio bearer, a radio bearer group, a logical channel, a logical channel group, a carrier and/or a carrier group.

3. The method for integrity protection according to claim 1, wherein the configuration information for integrity protection is further used for configuring an initial state of the integrity protection function of the at least one transmission resource as activated or deactivated.

4. The method for integrity protection according to claim 1, wherein the configuration information for integrity protection is further used for configuring a number of Packet Data Convergence Protocol Protocol Data Units (PDCP PDUs) or Service Data Units (SDUs) which are transmitted on the at least one transmission resource and need integrity protection, or a duration of performing the integrity protection.

5. The method for integrity protection according to claim 1, wherein a sub-header of the activation/deactivation MAC control element comprises a Logical Channel Identify (LCID) field, the LCID field indicates that a type of the activation/deactivation MAC control element is a MAC control element used for activating/deactivating the integrity protection function for the transmission resources, the MAC control element comprises at least one bitmap field carrying the activation/deactivation information of the integrity protection function.

6. The method for integrity protection according to claim 5, wherein each bit of the bitmap field corresponds to one transmission resource configured with the integrity protection function.

7. The method for integrity protection according to claim 1, wherein the DCI in the PDCCH comprises at least one bitmap field carrying the activation/deactivation information of the integrity protection function.

8. The method for integrity protection according to claim 1, after sending the configuration information for integrity protection to the terminal by the RRC layer message by the base station, further comprising:

sending, by the base station, deconfiguration information for integrity protection to the terminal by the RRC layer message, wherein the deconfiguration information for integrity protection is used for deconfiguring the integrity protection function for the at least one transmission resource of the terminal.

9. A base station, comprising: a memory, a processor, and a computer program stored in the memory and capable of being executed by the processor, the processor is configured to execute the computer program to perform the method for integrity protection according to claim 1.

10. A method for integrity protection, applied to a terminal, comprising:

receiving, by the terminal, configuration information for integrity protection sent by a base station by a Radio Resource Control (RRC) layer message, wherein the configuration information for integrity protection is used for configuring an integrity protection function for at least one transmission resource used by the terminal in a transmission of service data; and configuring, by the terminal, the integrity protection function for the at least one transmission resource according to the configuration information for integrity protection, wherein the configuring the integrity protection function for the at least one transmission resource according to the configuration information for integrity protection by the terminal, further comprises:

receiving, by the terminal, activation/deactivation information of the integrity protection function sent by the base station by the RRC layer message, a Media Access Control (MAC) layer message or a physical layer message, wherein the activation/deactivation information of the integrity protection function is used for activating/deactivating the integrity protection function for the at least one transmission resource configured with the integrity protection function; and activating/deactivating, by the terminal, the integrity protection function for the at least one transmission resource configured with the integrity protection function according to the activation/deactivation information of the integrity protection function, and wherein the activating/deactivating the integrity protection function for the at least one transmission resource configured with the integrity protection function by the terminal according to the activation/deactivation information of the integrity protection function, comprises:

when the activation/deactivation information of the integrity protection function sent by the base station by the MAC layer message is received, obtaining, by the terminal, the activation/deactivation information of the integrity protection function from an activation/deactivation MAC control element of the MAC layer message; or when the activation/deactivation information of the integrity protection function sent by the base station by the physical layer message is received, obtaining, by the terminal, the activation/deactivation information of the integrity protection function from the physical layer message, wherein the physical layer message is Downlink Control Information (DCI) in a Physical Downlink Control Channel (PDCCH).

11. The method for integrity protection according to claim 10, wherein the transmission resource comprises a data radio bearer, a radio bearer group, a logical channel, a logical channel group, a carrier and/or a carrier group.

12. The method for integrity protection according to claim 10, wherein the configuration information for integrity protection is further used for configuring an initial state of the integrity protection function of the at least one transmission resource as activated or deactivated;

the configuring the integrity protection function for the at least one transmission resource according to the configuration information for integrity protection by the terminal, comprises:
when the configuration information for integrity protection indicates that the initial state of the integrity protection function of one transmission resource is activated, activating, by the terminal, the integrity protection function of the corresponding transmission resource;
when the configuration information for integrity protection indicates that the initial state of the integrity protection function of one transmission resource is deactivated, recording, by the terminal, the initial state of the integrity protection function of the corresponding transmission resource as deactivated.

13. The method for integrity protection according to claim 10, wherein the configuring the integrity protection function for the at least one transmission resource by the terminal according to the configuration information for integrity protection, comprises:
activating, by the terminal, the integrity protection function for the at least one transmission resource while configuring the integrity protection function for the at least one transmission resource according to the configuration information for integrity protection; or
recording, by the terminal, an initial state of the integrity protection function of the corresponding transmission resource as deactivated while configuring the integrity protection function for the at least one transmission resource according to the configuration information for integrity protection.

14. The method for integrity protection according to claim 10, wherein the configuration information for integrity protection is further used for configuring a number of Packet Data Convergence Protocol Protocol Data Units (PDCP PDUs) or Service Data Units (SDUs) which are transmitted on the at least one transmission resource and need integrity protection, or a duration of performing the integrity protection;
the configuring the integrity protection function for the at least one transmission resource according to the configuration information for integrity protection by the terminal, comprises:
performing, by the terminal, the integrity protection for the PDCP PDUs or SDUs which are transmitted on the at least one transmission resource and need integrity protection, or
performing, by the terminal, the integrity protection for the PDCP PDUs or SDUs transmitted on the at least one transmission resource in the duration.

15. The method for integrity protection according to claim 10, after receiving the configuration information for integrity protection sent by the base station by the RRC layer message by the terminal, further comprising:
receiving, by the terminal, deconfiguration information for integrity protection sent by the base station by the RRC layer message, wherein the deconfiguration information for integrity protection is used for deconfiguring the integrity protection function for the at least one transmission resource of the terminal; and
deconfiguring, by the terminal, the integrity protection function for the at least one transmission resource according to the deconfiguration information for integrity protection.

16. A terminal, comprising: a memory, a processor, and a computer program stored in the memory and capable of being executed by the processor, the processor is configured to execute the computer program to perform the method for integrity protection according to claim 10.

* * * * *